(12) United States Patent
Runstadler

(10) Patent No.: US 6,525,781 B1
(45) Date of Patent: Feb. 25, 2003

(54) SECAM VIDEO STANDARD CHROMA MODULATION CIRCUIT

(75) Inventor: Peter W. Runstadler, Holliston, MA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/523,489

(22) Filed: Mar. 10, 2000

(51) Int. Cl.[7] .................................................. H04N 9/65
(52) U.S. Cl. ...................................... 348/642; 348/491
(58) Field of Search ................................. 348/642, 724, 348/723, 708, 710, 713, 659, 661, 663, 638; H04N 9/65

(56) References Cited

U.S. PATENT DOCUMENTS

| | | | | |
|---|---|---|---|---|
| 4,992,852 A | * | 2/1991 | Sekizawa et al. ............ | 348/455 |
| 5,402,180 A | * | 3/1995 | Jung ............................ | 348/642 |
| 5,486,875 A | * | 1/1996 | Sakurai ....................... | 348/642 |
| 5,929,937 A | * | 7/1999 | Hwang ........................ | 348/638 |

OTHER PUBLICATIONS

Video Demystified, A Handbook for the Digital Engineer, Second Edition, By Keith Jack, pp. 173–179.

* cited by examiner

*Primary Examiner*—Michael H. Lee
(74) *Attorney, Agent, or Firm*—Christopher P. Maiorana, PC

(57) ABSTRACT

An apparatus comprising a first circuit and a second circuit. The first circuit may be configured to present a first signal and a second signal in response to (i) a select signal, (ii) a first difference signal and (iii) a second difference signal. The second circuit may be configured to present a modulated output signal in response to the first signal, the second signal and a control signal. The first circuit may alternately operate on one of either (i) the first difference signal or (ii) the second difference signal. In one example, the present invention may be implemented as a SECAM video encoder.

20 Claims, 4 Drawing Sheets

SECAM VIDEO STANDARD CHROMA MODULATION CIRCUIT

FIELD OF THE INVENTION

The present invention relates to digital frequency modulators for the Sequentiel Couleur Avec Memoire (SECAM) color television standard generally and, more particularly, to a method and/or architecture for a frequency modulated subcarrier using a single low frequency pre-emphasis filter and P/Q ratio counter.

BACKGROUND OF THE INVENTION

Sequentiel Couleur Avec Memoire (SECAM) is a video standard that defines a 50 field per second, interlaced 625 line video format. Color information is conveyed with the use of frequency modulation (FM). Red and blue color difference information is frequency modulated on alternating lines (i.e., one color difference signal per line).

Previous digital SECAM encoder designs, such as the design described on pages 173–179 of "Video Demystified" by Keith Jack, use two low frequency pre-emphasis filters and P/Q ratio counters. The previous designs implement a first filter and ratio counter pair for red color difference modulation and a second filter and ratio counter pair for blue color difference modulation.

The vast majority of SECAM encoders have been designed using analog techniques. The conventional analog designs comprise two reference frequency generators with associated phase control loops. Such analog designs are tied very closely to a specific process technology and cannot be easily ported to other processes and/or integrated with other system functionality on a single device.

SUMMARY OF THE INVENTION

The present invention concerns an apparatus comprising a first circuit and a second circuit. The first circuit may be configured to present a first signal and a second signal in response to (i) a select signal, (ii) a first difference signal and (iii) a second difference signal. The second circuit may be configured to present a modulated output signal in response to the first signal, the second signal and a control signal. The first circuit may alternately operate on one of either (i) the first difference signal or (ii) the second difference signal.

The objects, features and advantages of the present invention include providing a method and/or architecture for modulating a chroma video component (e.g., in a SECAM signal) that may (i) generate a modulated subcarrier for color difference signals with a single filter and ratio counter combination, (ii) allow color difference signals to be filtered and modulated on alternating lines, (iii) set a current subcarrier starting phase for each video line, (iv) initialize a low frequency pre-emphasis filter for each video line, (v) be implemented using fewer transistors and reduced die space, (vi) provide a reduced power dissipation and/or (vii) provide a modulated subcarrier with extremely small frequency errors.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
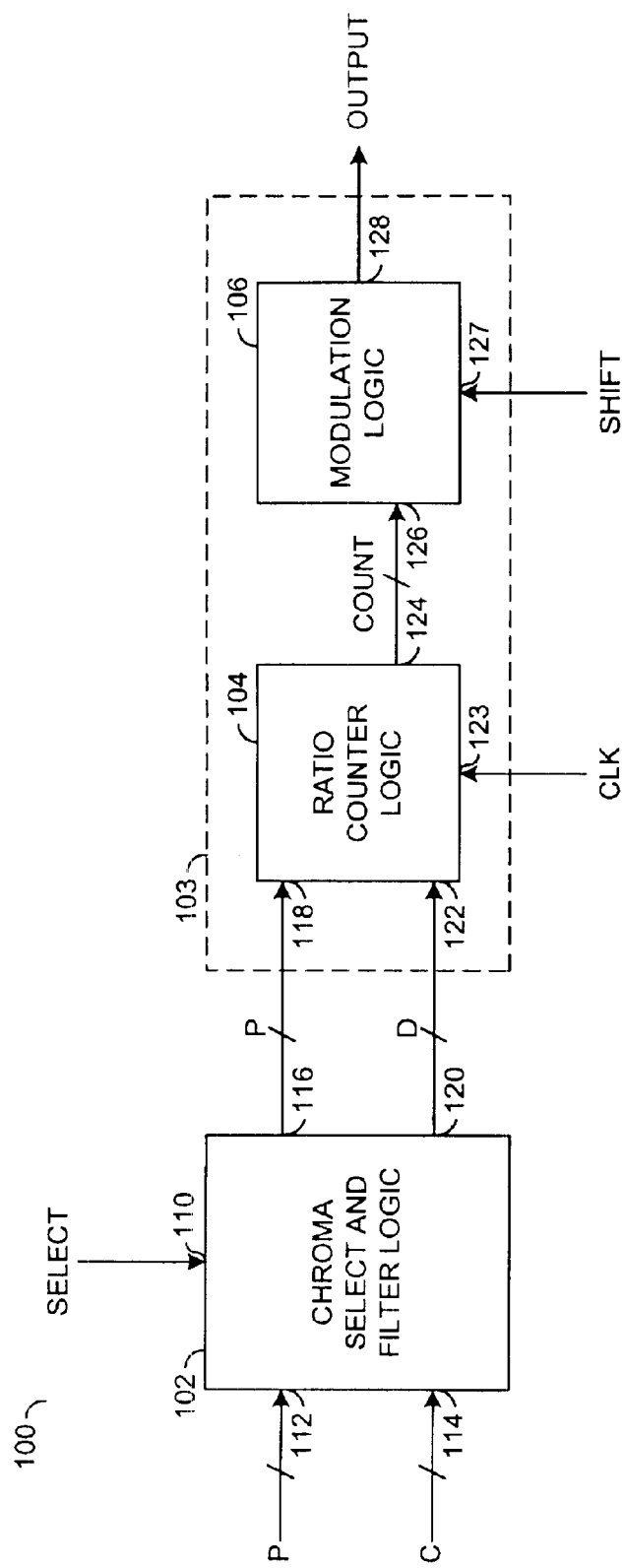
FIG. 1 is a block diagram of a preferred embodiment of the present invention.

Referring to FIG. 1, a block diagram of a circuit 100 is shown in accordance with a preferred embodiment of the present invention. The circuit 100 generally comprises a chroma select and filter block (or circuit) 102 and an output logic block 103. The output logic block 103 generally comprises a ratio counter logic block (or circuit) 104 and a modulation logic block (or circuit) 106.

The chroma select and filter logic circuit 102 may have an input 110 that may receive a control signal (e.g., SELECT), an input 112 that may receive a signal (e.g., P) and an input 114 that may receive a signal (e.g., C). The signal P and the signal C may each be implemented, in one example, as multi-bit signals. The chroma select and filter logic circuit 102 may have an output 116 that may present a signal (e.g., P') to an input 118 of the ratio counter logic circuit 104. The chroma select and filter logic circuit 102 may also have an output 120 that may present a signal (e.g., D) to an input 122 of the ratio counter logic circuit 104.

The ratio counter logic circuit 104 may have an input 123 that may receive a signal (e.g., CLK). The ratio counter logic circuit 104 may have an output 124 that may present a signal (e.g., COUNT) to an input 126 of the modulation logic circuit 106. The ratio counter logic circuit 104 may determine a P/Q ratio of the signal P' to the signal D. The ratio counter logic block 104 may present the signal COUNT in response to the signal CLK, the signal P' and the signal D.

The modulation logic circuit 106 may have an input 127 that may receive a signal (e.g., SHIFT). The signal SHIFT may be implemented to control a phase shift of the modulation logic block 106. The modulation logic circuit 106 may have an output 128 that may present a signal (e.g., OUTPUT). The signal OUTPUT may be implemented, in one example, as a frequency modulated (FM) chroma subcarrier signal. The circuit 100 may be implemented, in one example, as a digital frequency modulator that may be used, in one example, in the Sequentiel Couleur Avec Memoire (SECAM) color television standard (ITUBT.470-3 which is hereby incorporated by reference in its entirety) encoder. The circuit 100 may generate the frequency modulated subcarrier signal OUTPUT using a single low frequency pre-emphasis filter and a P/Q ratio counter (to be described in more detail in connection with FIGS. 2–4).

Figure 2:
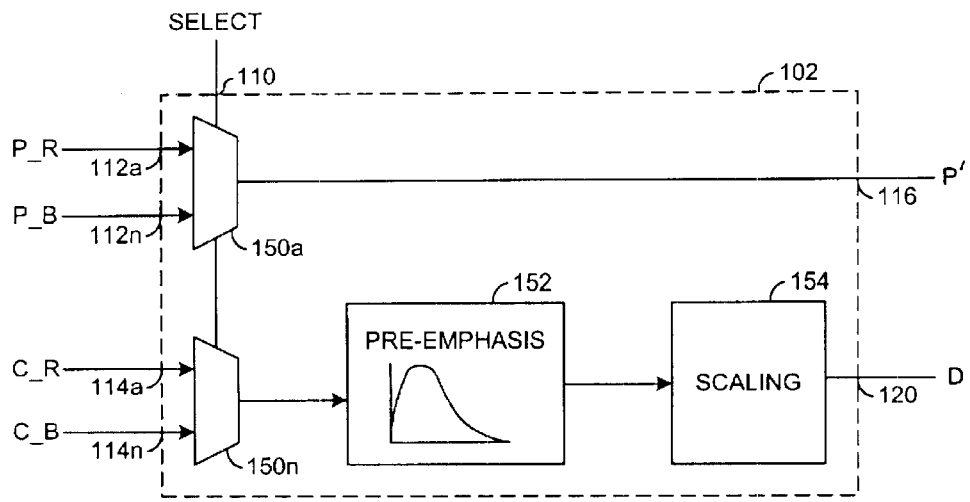
FIG. 2 is a detailed block diagram of a chroma select and filter logic block of FIG. 1.

Referring to FIG. 2, a more detailed diagram of the chroma select and filter logic block 102 is shown. The chroma select and filter logic block 102 comprises a number of multiplexers 150a–150n, a pre-emphasis block (or circuit) 152 and a scaling block (or circuit) 154. In one example, the pre-emphasis block 152 may be implemented as a SECAM low frequency pre-emphasis filter. In another example, the pre-emphasis block 152 may be implemented using a single two pole bi-quad design. However, other filters may be implemented to meet the design criteria of a particular implementation.

The multiplexer 150a may select either the signal P_R or the signal P_B in response to the signal SELECT. The signal P_R and the signal P_B may be implemented, in one example, as center frequency signals for the colors red and blue, respectively. The multiplexer 150a may present the signal P' in response to the signal P_R, the signal P_B and the signal SELECT. The signal P' may be representative of the signal P. The signal P'_R may represent the multiplexed signal P_R. The signal P'_B may represent the multiplexed signal P_B. The signal C_R and the signal C_B may be implemented, in one example, as color difference signals for the colors red and blue, respectively. However, the signals P_R, P_B, C_R and C_B may be implemented as an appropriate signal in order to meet the design criteria of a particular implementation. The multiplexer 150n may select either the signal C_R or the signal C_B in response to the signal SELECT. The multiplexed signal from the multiplexer circuit 150n is generally presented to the pre-emphasis circuit 152. The pre-emphasis circuit 152 may present an output to the scaling circuit 154. The scaling circuit 154 may present the signal D in response to the pre-emphasis circuit 152. The signal D_R may represent the scaled signal C_R. The signal D_B may represent the scaled signal C_B.

Figure 3:
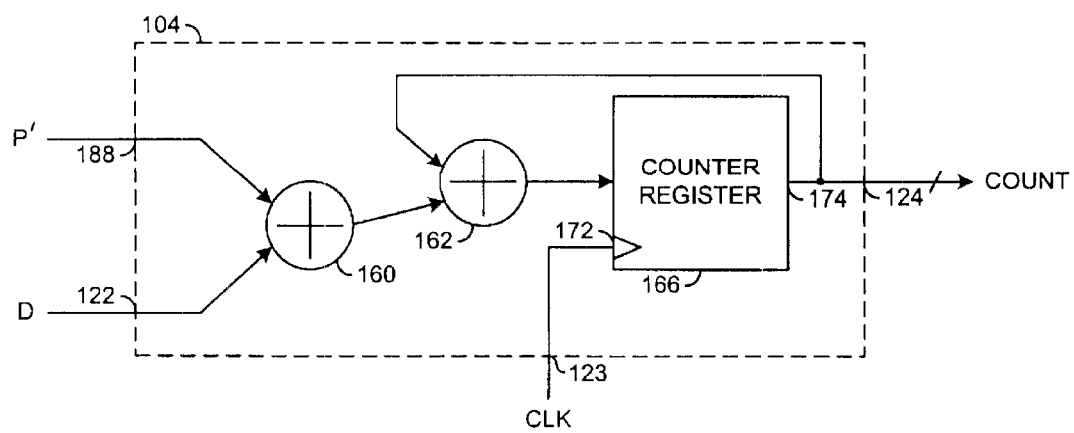
FIG. 3 is a detailed block diagram of a ratio counter logic block of FIG. 1.

Referring to FIG. 3, a more detailed diagram of the ratio counter logic block 104 is shown. The ratio counter logic 104 may comprise an adder circuit 160, an adder circuit 162 and a counter register 166. The ratio counter logic circuit 104 may present the signal P' and the signal D to a first and a second input of the adder 160, respectively. The ratio counter block 104 generally comprises the adder 160, the adder 162 and the counter register 166 and may have a maximum value of Q, where Q is incremented by P' and D. The adder circuit 160 may present a signal to a first input of the adder circuit 162 in response to the signals P' and D. The adder circuit 162 may have a second input that may receive the signal COUNT. The signal COUNT may be implemented as a multi-bit signal where, $COUNT_{(N-1)}+(P'+D)=COUNT_N$. The maximum value of the signal COUNT=Q (COUNT roles over at Q; the counter register 166 may be m bits wide, where m=the register width, such that $Q=2^m$) when COUNT is used to address a sampled sine wave in a quarter sine wave ROM (to be discussed in connection with FIG. 4). The signal COUNT may allow the circuit 100 to generate the signal OUTPUT with a sine wave having a frequency of $(P'+D)/Q \times f_{CLK}$, where the frequency is the frequency of the signal CLK. Additionally, the counter register 166 may have an input 172 that may receive the signal CLK. The counter register 166 may have an output 174 that may present the signal COUNT.

Figure 4:
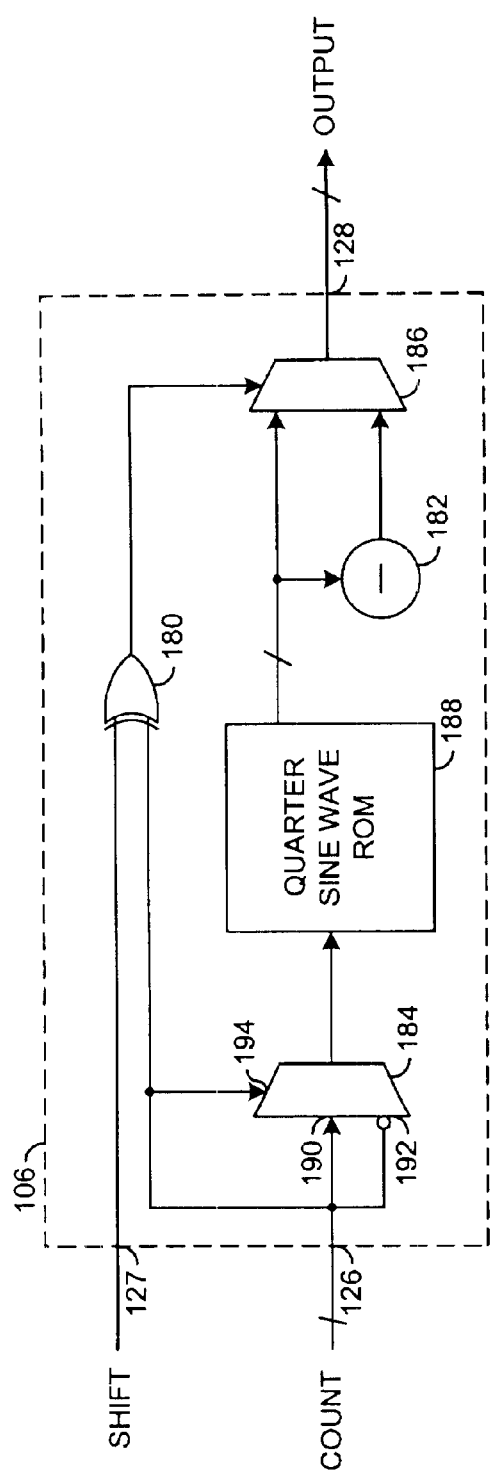
FIG. 4 is a detailed block diagram of a modulation logic block of FIG. 1.

Referring to FIG. 4, a more detailed diagram of the modulation logic block 106 is shown. The modulation logic block 106 generally comprises a gate 180, a subtraction circuit 182, a multiplexer 184, a multiplexer 186 and a quarter sine wave ROM 188. The gate 180 may be implemented, in one example, as an XOR gate. However, the gate 180 may be implemented as an appropriate logic gate in order to meet the design criteria of a particular implementation. The gate 180 may receive the signal SHIFT and the signal COUNT at a first input and a second input, respectively. The signal COUNT may additionally be presented to an input 190, an input 192 and an input 194 of the multiplexer 184. The multiplexer 184 may present a signal to the quarter sine wave ROM 188. The quarter sine wave ROM 188 may present a multi-bit signal to the subtraction circuit 182 and the multiplexer 186. Additionally, the subtraction circuit 182 may present a signal to the multiplexer 186. The multiplexer 186 may present the signal OUTPUT in response to the gate 180, the quarter sine wave ROM 188 and the subtraction circuit 182.

Figure 5:
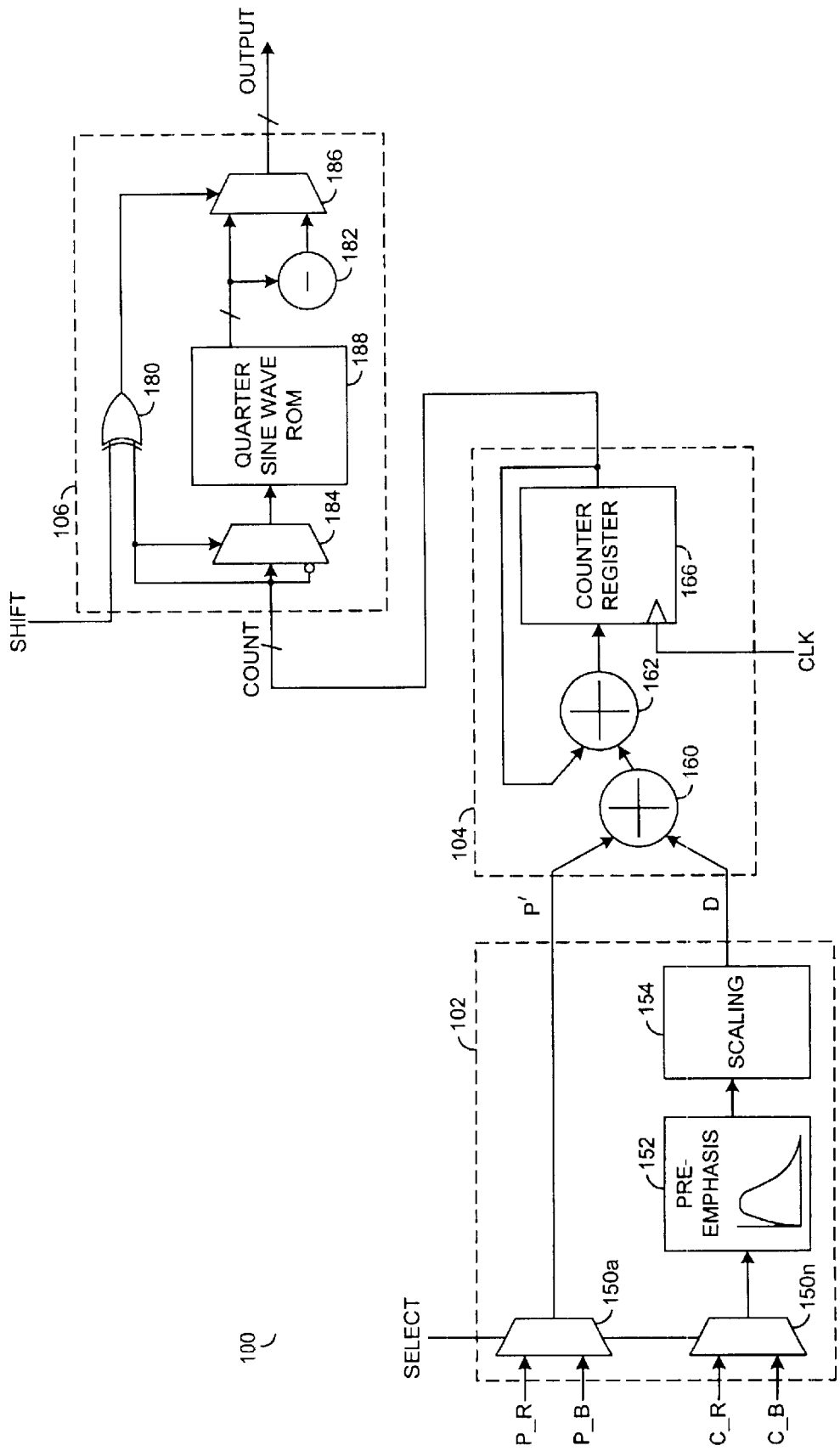
FIG. 5 is a detailed overview of the present invention.

Referring to FIG. 5, a detailed overview of the circuit 100 is shown. The circuit 100 may be implemented to modulate the chroma components of SECAM video. The circuit 100 may take advantage of several properties of the SECAM standard to generate a modulated subcarrier for both of the color difference signals C_R and C_B by using a single filter and ratio counter combination (pre-emphasis filter 152 and P/Q ratio counter 160).

For SECAM video, red and blue color difference information is generally frequency modulated on alternating lines (e.g., one color difference signal per line). The red and blue color difference signals (C_R and C_B) may also be filtered with the SECAM low frequency pre-emphasis filter 152 on alternating lines. The SECAM standard may provide an adequate amount of time to set the subcarrier phase and to initialize the single low frequency pre-emphasis filter 152 for each line. The SECAM standard requires that the chroma subcarrier is removed during a large portion of the blanking interval. The low frequency pre-emphasis filter 152 may be initialized during the blanking interval to remove the chroma subcarrier.

The SECAM standard may also require that a phase of the SECAM chroma subcarrier at the start of the white reference burst be the same, or different by 180 degrees, as an initial phase at the start of the white reference burst on the previous line, depending on the stage of the SECAM subcarrier phase polarity switching sequence. A phase shift of the SECAM chroma subcarrier may be provided by the signal SHIFT. The SECAM phase standard may allow a simple phase inversion controller (not shown) to select the starting phase of the subcarrier output for each line.

The circuit 100 may yield a smaller design with lower power dissipation by using a single low frequency pre-emphasis filter 152 and a single P/Q ratio counter 160. The circuit 100 may produce a high quality modulated subcarrier with extremely small frequency errors.

Frequency deviation from the ideal SECAM modulation frequencies generally depends on the precision carried by the digital portion of the circuit 100 and the quality of the implementation of the digital to analog conversion performed externally.

With the use of digital design techniques, the circuit 100 may be easily portable between processes and may be integrated with other digital designs on a single piece of silicon or on a single integrated circuit. Methodologies such as Coreware™ (commercially available from LSI Logic) may be supported. Such support may allow system-on-chip (SoC) level integration.

The color difference signals C_R and C_B may be first processed by the pre-emphasis filter 152. In general, only a single pre-emphasis filter is required if a single color difference signal is processed on any particular line. The portion of the line timing outside the active video may be used to initialize the single pre-emphasis filter 152 with a color difference signal corresponding to the color black.

After processing by the pre-emphasis filter 152, the filtered color difference signals C_R and/or C_B may be scaled by the scaling block 154. The scaling block 154 may be implemented to meet the SECAM maximum frequency deviation requirements. The scaling block 154 may present a deviation signal D that may represent the red scaled color difference signal D_R and the blue scaled color difference signal D_B. The scaling process may be accomplished by first removing an offset from the color difference signals C_R and C_B. The resulting color signals are then scaled such that the following deviations may be achieved by a frequency modulation (FM) process for 100 percent saturated color bars as required by the SECAM standard, as shown by the following examples.

Maximum frequency deviation for red color difference is FM=±280 KHz.

Maximum frequency deviation f or blue color difference is FM=±230 KHz.

The subcarrier for the FM process may be generated by addressing a stored quarter sine wave (188) with a P/Q ratio counter (104) clocked at, for example, 27 MHz and a Q equal to $2048 \times 2^{10}=2097152$.

(P/Q)27 MHz=Subcarrier frequency=Fs, P=QFs/27 MHz
The maximum ranges for D_R and D_B may be as follows:

For P=D_R max, (Drmax/Q)*27 MHz=±280 kHz, Drmax=±21.24

For P=D_B max, (Dbmax/Q)*27 MHz=±230 kHz, Dbmax=±17.45

The D_R range after scaling is generally plus or minus 21.24. The D_B range after scaling is generally plus or minus 17.45. Scaling factors may be determined from these ranges. Scaling factor multiplication may be implemented, in one example, using a minimal signed digit encoding of the scale factors to a precision of 1/4096.

(Crmax-128)Drscale=21.24, Crmax=Maximum Cr for 100% color bar image (Cbmax-128)Dbscale=17.45, Cbmax=Maximum Cb for 100% color bar image Drscale=21.24/84=0.2528>>0.010000001100 (binary) =0.2529=¼+⅟512+⅟1024

Dbscale=17.45/84=0.2077>>0.001101010011 (binary) =0.2078=⅛+⅟16+⅟64+⅟256+⅟2048+⅟4096

The scaled color difference signals D_R and D_B, including significant fractional precision, may be used to control the P/Q ratio counter 160. The P' values used for the center frequencies for each color red and blue may be deviated by the scaled color difference signals D_R and D_B to generate the required frequency deviation for SECAM chroma modulation. The frequency deviation is generally completed by adding the scaled color difference signals (D_R for red lines and D_B for blue lines) to the P value representing the center frequency (P'_R for red lines and P'_B for blue lines) in the ratio counter 160. The deviation of the signal P generally causes a frequency deviation in the subcarrier. The frequency deviation is directly proportional to the magnitude of the scaled color difference signals D_R and D_B. The P/Q ratio counter 160 may be implemented for both color difference signals, switching between D_R and D_B on alternating lines.

The adder 160, the adder 162 and the counter register 166 may be implemented, in one example, as 21-bit devices. Such an implementation may allow for 10 bits of fractional precision with a Q of 2048. The center frequencies (P'_R and P'_B) for the scaled color difference signals D_R and D_B are specified as 4.406250 MHz and 4.250000 MHz, respectively by the ITUBT.470-3 specification. The recommendation in ITUBT.470-3 standard allows for the center frequencies to be within 2 kHz of these frequencies. The following P and Q values illustrate examples that may be used to generate center frequencies:

Q=2048×210=2097152

4.40625 MHz=(Pr/Q)27 MHz, 4.25000 MHz=(Pb/Q)27 MHz

P_R=334.2222×210=342244,

P_B=322.3704×210=330107

Such an implementation may result in the following frequencies:

F_R=4.40625572 MHz, F_B=4.24999666 MHz

F_R error=5.7 Hz, F_B error=−3.3 Hz

These center frequencies are well within the ranges specified in ITUBT.470-3.

The ten least significant bits output from the P/Q ratio counter 160 may be used to address a stored quarter sine wave samples of the quarter sine wave circuit (ROM) 188. The two most significant bits from the ratio counter 160 may be used to invert the address (e.g., invert the order of the quarter sine wave samples) and negate the sine wave sample values in order to generate all four quarter sine wave sections of the subcarrier (e.g., a full sine wave).

The following SECAM properties may enable the use of one ratio counter 160 for both color difference signals:

SECAM red and blue color difference information is frequency modulated on alternating lines (e.g., one color difference signal per line). The two center frequencies (e.g., one for each color difference) do not have to be generated simultaneously, but can be generated one at a time on alternating lines.

The SECAM standard requires that the chroma subcarrier is removed during a substantial portion (e.g., time period) of the blanking intervals, from the end of active video to the start of the white reference burst on the following line. The time period without modulation gives adequate time to set the subcarrier phase for the start of the white reference burst.

The phase of the SECAM chroma subcarrier at the start of the white reference burst is always the same or different by 180 degrees from line to line, depending on the position in the SECAM subcarrier phase polarity switching sequence. The phase of the SECAM chroma subcarrier may allow a simple phase inversion controller (not shown) to select the starting phase of the subcarrier. In certain encoder designs, the phase inversion control inverts the most significant bit in the address for the stored quarter sine wave when a phase inversion is required.

In addition to the chroma portion of SECAM active video, "bottle pulse" line identification signals and white reference burst may be produced using the subcarrier generated by the P/Q ratio counter 160.

In a SECAM encoder, the modulated subcarrier signal OUTPUT may be filtered with the SECAM high frequency pre-emphasis filter 152 and added to the SECAM luma video component. Blanking may be inserted before being presented through a DAC to produce analog composite SECAM video.

The present invention may be valuable in the implementation of a digital SECAM video encoder. The SECAM standard is used by a large percentage (e.g., around 30 percent) of the television sets in the world. Therefore, SECAM represents a large market for video encoder IC manufacturers. The present invention generates a high quality frequency modulated subcarrier for the chroma component of SECAM video using fewer transistors and dissipating less power than previous methods.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first circuit configured to present a first signal and a second signal in response to (i) a select signal, (ii) a center frequency signal and (iii) a difference signal; and
   a second circuit configured to present a modulated output signal in response to said first signal, said second signal and a first control signal, wherein said first circuit alternately operates on one of (i) a first component of said difference signal and (ii) a second component of said difference signal.

2. The circuit according to claim 1, wherein said second circuit comprises:
   (i) a ratio counter circuit configured to generate a second control signal in response to said first and second signals; and
   (ii) a modulation circuit configured to generate said modulated output signal in response to said second control signal.

3. The circuit according to claim 2, wherein said modulation circuit is further configured to generate said modulated output signal in response to said first control signal, wherein said second control signal comprises a count signal.

4. The circuit according to claim 3, wherein said first control signal comprises a phase shift signal configured to shift a phase of said modulated output signal.

5. The circuit according to claim 3, wherein said ratio counter circuit is further configured to present said count signal in response to a clock signal.

6. The circuit according to claim 3, wherein said first circuit comprises a chroma select and filter circuit.

7. The apparatus according to claim 1, wherein said first circuit comprises one or more first multiplexers, each configured to select a component of said center frequency and said difference signals.

8. The apparatus according to claim 7, wherein said first circuit further comprises (i) a pre-emphasis filter configured to filter said selected component of said difference signal and (ii) a scaling circuit configured to scale said selected component of said difference signal by a predetermined scaling factor.

9. The apparatus according to claim 8, wherein said second circuit comprises a ratio counter circuit comprising:
   a first adder configured to add said selected component of said center frequency signal and said filtered and scaled selected component of said difference signal;
   a second adder configured to add an output of said first adder and a count signal; and
   a counter register configured to generate said count signal in response to an output of said second adder.

10. The apparatus according to claim 9, wherein said second circuit further comprises a modulation circuit comprising:
    a gate configured to (i) receive (a) said first control signal and (b) said count signal and (ii) control a phase of said modulated output signal;
    a second multiplexer configured to present a signal to a quarter sine wave ROM in response to said count signal; and
    a third multiplexer configured to generate said modulated output signal in response to an output of said quarter sine wave ROM.

11. The apparatus according to claim 1, wherein said first and second difference signals comprise components of a SECAM video signal.

12. The apparatus according to claim 1, wherein said second signal comprises a scaled color difference signal.

13. An apparatus comprising:
    means for generating a first signal and a second signal in response to (i) a select signal, (ii) a center frequency signal and (iii) a difference signal; and
    means for generating a modulated output signal in response to said first signal, said second signal and a control signal, wherein said means for generating said first and second signals alternately operates on one of (i) a first component of said difference signal and (ii) a second component of said difference signal.

14. A method for generating a modulated output signal comprising the steps of:
    (A) generating a first signal in response to (i) a select signal, (ii) a first center frequency signal and (iii) a second center frequency signal; and
    (B) generating a second signal by alternately operating on one of (i) a first difference signal and (ii) a second difference signal selected in response to said select signal.

15. The method according to claim 14, further comprising the steps of:
    generating a first control signal in response to said first and second signals; and
    generating said modulated output signal in response to said first control signal.

16. The method according to claim 15, further comprising the step of:
    generating said modulated output signal in further response to a second control signal, wherein said first control signal comprises a count signal.

17. The method according to claim 16, further comprising step of:
    shifting a phase of said modulated output signal in response to said second control signal.

18. The method according to claim 14, wherein step (B) further comprises the steps of:
    filtering a selected one of said first and second difference signals; and
    scaling said selected difference signal by a predetermined scaling factor.

19. The method according to claim 14, wherein said first and second difference signals comprise components of a SECAM video signal.

20. The method according to claim 14, wherein said second signal comprises a scaled color difference signal.

* * * * *